(12) United States Patent
Ballard

(10) Patent No.: US 7,043,089 B2
(45) Date of Patent: May 9, 2006

(54) OVERFLOW ERROR DIFFUSION

(75) Inventor: Paul N. Ballard, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 604 days.

(21) Appl. No.: 10/375,403

(22) Filed: Feb. 27, 2003

(65) Prior Publication Data
US 2004/0181727 A1 Sep. 16, 2004

(51) Int. Cl.
*H04N 1/405* (2006.01)
*H04N 1/52* (2006.01)

(52) U.S. Cl. .................. 382/237; 345/596; 345/597; 345/598; 345/599; 345/616; 358/3.03; 358/3.04; 358/3.05; 358/3.22; 382/252

(58) Field of Classification Search ........ 345/596–599, 345/616; 358/3.03–3.05, 3.22; 382/237, 382/252
See application file for complete search history.

(56) References Cited

U.S. PATENT DOCUMENTS

| 5,051,841 A | 9/1991 | Bowers et al. |
| 5,835,687 A | 11/1998 | Brown et al. |
| 6,191,868 B1 * | 2/2001 | Shibuya et al. ............ 358/3.23 |
| 6,912,068 B1 * | 6/2005 | Hirota et al. ............... 358/3.05 |

OTHER PUBLICATIONS

Metaxas, P.; Parallel digital halftoning by error-diffusion; Jun. 2003; Proceedings of the Paris C. Kanellakis memorial workshop on Principles of computing & knowledge: Paris C. Kanellakis memorial workshop on the occasion of his 50th birthday PCK50.*

* cited by examiner

*Primary Examiner*—R. Stephen Dildine

(57) ABSTRACT

Methods, devices and systems for overflow error diffusion in image processing are provided. A method includes calculating error values, $e_m$, corresponding to differences between modified intensity values for a number of pixel locations and one or more threshold values, where $e_m$ represents an error value associated with an $m^{th}$ pixel. The method further includes diffusing a calculated overflow error value associated with each calculated error value, $e_m$, to at least one pixel neighbor of the $m^{th}$ pixel location.

35 Claims, 6 Drawing Sheets

|  | P(X,Y) |  | 4 |
|---|---|---|---|
| 1 | 2 | 1 |  |

*Fig. 2A*

|  | P(X,Y) |  | 1 |
|---|---|---|---|
| 2 | 1 | 4 |  |

*Fig. 2B*

|  | P(X,Y) |  | 2 |
|---|---|---|---|
| 1 | 4 | 1 |  |

*Fig. 2C*

|  | P(X,Y) |  | 1 |
|---|---|---|---|
| 4 | 1 | 2 |  |

*Fig. 2D*

OVERFLOW ERROR DIFFUSION

INTRODUCTION

Digital halftone printing involves a process of converting an image comprising a large number of gray or color levels to a reduced number of gray or color levels to render the image for display or output (hardcopy). The image, whether in color or black and white, is first scanned by an optical scanner in a gray level format containing a large number of gray density levels, for example, 256 levels or an 8-bit pixel image for black and white images and more than 16 million ($256^3$) levels for color images, which is usually not reproducible on standard digital printing and display systems. Thus, images are converted from the large number of gray scale levels to a fewer number of gray level values (for example, binary) in order that the image may be rendered on displays and printing systems.

Error diffusion halftoning may be used to convert a large number of gray scale levels of an original image to a binary or lesser level gray while attempting to preserve gray density of the images. This technique attempts to maintain gray density by making the conversion from gray pixels to binary or other lower level pixels on a pixel-by-pixel basis. The error diffusion halftoning process is built upon the process of calculating and diffusing error terms for each processed pixel to that pixel's surrounding neighbor pixels.

Some error diffusion hardware implementations may lend themselves to having a fractional unused portion of the error diffusion term, referred to herein as "overflow error," that is generated when calculating the individual error diffusion terms. The handling of the fractional unused portion of the error diffusion term can affect the quality of the image produced using the results of the halftoning.

BRIEF DESCRIPTION OF THE DRAWINGS

FIGS. 2A–2D illustrate other dynamic weighting factor embodiments for error diffusion processes.

DETAILED DESCRIPTION

Figure 1A:
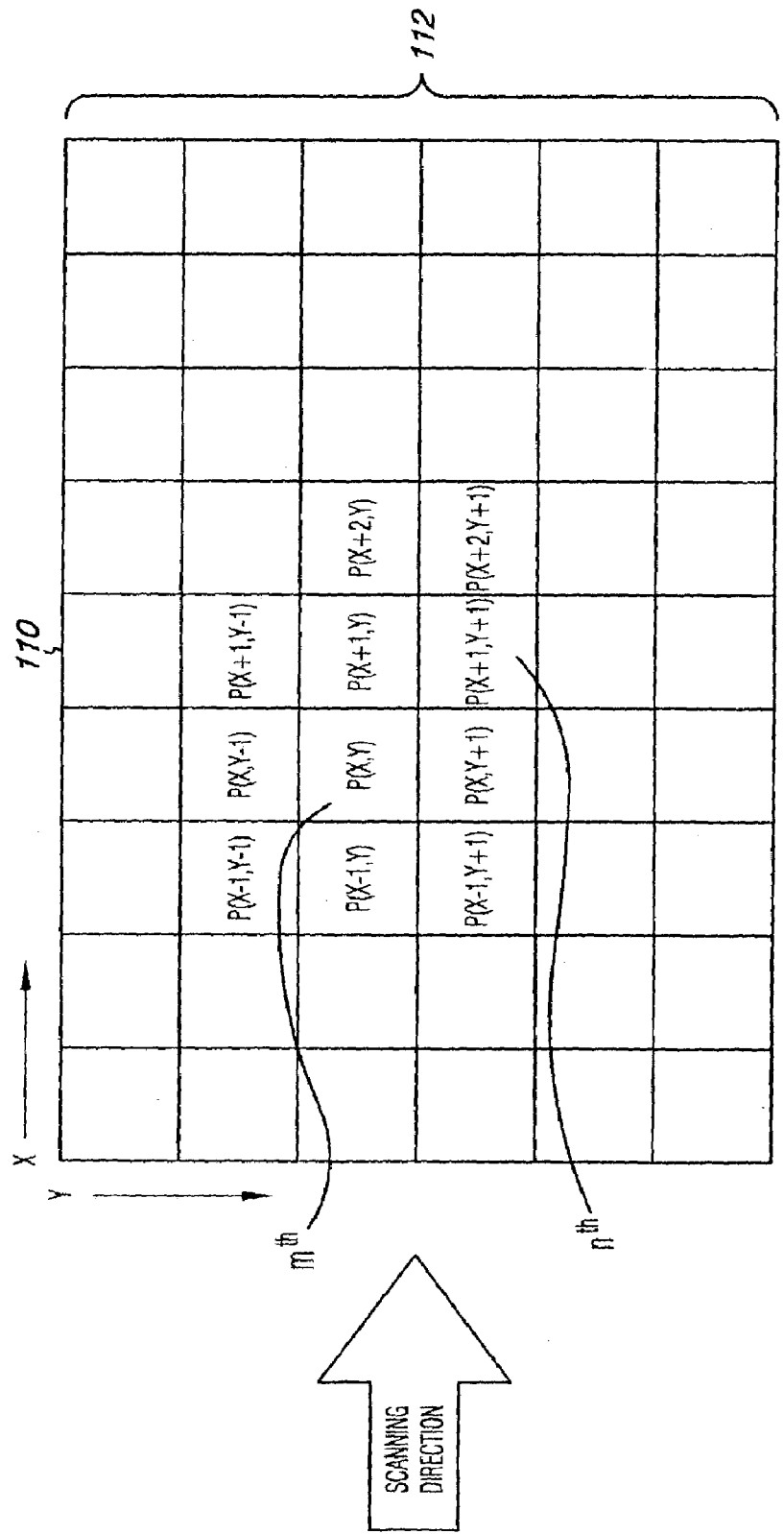
FIG. 1A illustrates an embodiment of an image having a number of pixels located thereon.

In digital halftone printing, an initial step is to scan an image with an optical scanner that detects light intensity values for selected colors. Then, for each pixel location, the detected data are converted to gray-scale values to provide a basis for image reproduction. Generally, for black and white images, gray-scale values range from 0 to 255 and can be represented as an 8-bit pixel image. According to certain conventions, 0 represents black on the gray-scale since little or no light intensity is detected in the scanning process. This is due the color black having low reflective properties. At the other end of the gray-scale, 255 represents white since a maximum light intensity is detected in the scanning process. This is due to white having high reflective properties. One of ordinary skill in the art will appreciate that other conventions can be used, however, and that the invention is not limited to a particular gray-scale value assignment scheme. That is, another convention can use a gray-scale value of 255 to represent black and a value of 0 for white.

To apply error diffusion techniques to black and white digital halftone printing, gray-scale values at detected pixel locations can be binary coded in reference to one or more threshold values. Typically, the binary coding threshold is some median value on a given gray-scale. Thus, by way of example and not by way of limitation, a threshold value of 127 can be used for gray-scale values which range from 0 to 255. Although a threshold value is usually held constant, it could be randomly varied, or dithered, in a range about a chosen value.

The following example is provided to illustrate an embodiment for binary coding gray-scale values at detected pixel locations. The invention however, is not so limited to the example provided. This example presumes a range of gray-scale values from 0 to 255 and presumes a gray-scale convention in which a 0 gray-scale value represents black and a 255 gray-scale value represents white. In the example, a gray-scale value of 127 is selected as the threshold value.

By way of example, and not by way of limitation, a pixel location with a detected gray-scale value of 110 would be coded as a binary "1" in an error diffusion system that uses a constant threshold of 127 since 110<127. Similarly, a pixel location with a gray-scale value of 145 would be coded as a binary "0" since 145>127.

By way of example, and not by way of limitation, certain monochrome printing systems assign the binary number "1" to a pixel location to direct the printer to place ink at the pixel location. In the example above, a pixel location encoded as a binary "1", e.g. for detected gray-scale values less than a threshold value, represents a presence of more color or black at the pixel location relative to the threshold value. This is true since, as noted above, more light intensity was absorbed rather than reflected by the image pixel as detected by a scanner. Hence, directing the printer to place ink at the pixel location attempts to replicate the presence of color in the scanned image as represented by the lower gray-scale value. In such printing systems, a pixel location encoded with the binary number "0" can direct the printer not to place ink at the pixel location. In the example above, a pixel location encoded as a binary "0", e.g. for detected gray-scale values equal to or greater than a threshold value, represents a presence of less color or white at the pixel location relative to the threshold value. This is true since, as noted above, more light intensity was reflected rather than absorbed by the image pixel as detected by the scanner. Here, directing the printer not to place ink at the pixel location attempts to replicate the lesser amount or absence or color in the scanned image as represented by the higher gray-scale value.

The above-described coding techniques for digital halftoning with error diffusion inherently result in coding errors for each pixel location having a gray-scale value other than 0 or 255. For instance, the magnitude of the coding error resulting from binary encoding a pixel location having a gray-scale value of 110 would be a positive number equal to 110 units as measured by gray-scale values. In black and white images, by way of example and not by way of limitation, the 110 units of gray-scale value error magnitude would represent the error between black ink provided to the pixel location in contrast to the detected true gray-scale value of less than full black. Similarly, the magnitude of the coding error for binary encoding of a pixel location having a gray-scale value of 147 would be a negative number equal to the detected value of 147 less the upper limit of the intensity scale, e.g. 147−255=−108 units as measured by gray-scale values. In this example, the −108 units of gray-scale value would represent the error between no ink (white) provided to the pixel location in contrast to the detected true gray-scale value of less than full white.

Alternatively stated, when a pixel at a given location (x,y) has a value z that is a number between 0 and the threshold value, e.g. 127, the magnitude of the encoding error (e) is simply equal to the value z in gray-scale units; that is, $$e_{x,y}=z \text{ for } z<T.$$

And, when a pixel value (z) lies between a threshold value (T) and the maximum gray-scale value, e.g. 255, the magnitude of the encoding error ($e_{x,y}$) will be a negative number equal to z minus 255 gray-scale units; that is $$e_{x,y}=z-255 \text{ for } z \geq T.$$

As one of ordinary skill in the art will appreciate upon reading this disclosure, binary encoding is one way to output error diffusion, and is discussed in detail herein for ease of reference. However, the invention is not limited to binary encoding techniques. One of ordinary skill in the art will appreciate that other encoding techniques, such as encoding techniques which produce multibit outputs are considered within the scope of the present invention. It is further noted that halftoning gray-scale values for black and white images are discussed in herein for ease of reference. However, one of ordinary skill in the art will appreciate upon reading this disclosure, that the various embodiments of the present invention apply equally to color halftoning implementations.

FIG. 1A illustrates an embodiment of an image having a number of pixels located thereon. In the embodiment of FIG. 1A, each box 110 in the image field 112 represents one pixel location on an image. As explained above, such an image can be presented for optical scanning. In the embodiment of FIG. 1A, an arrow illustrates a scanning direction from left to right across each pixel row and sequentially, row by row, from the top to the bottom of the field. Such a scanning pattern, as shown in the embodiment of FIG. 1A, can be described as a raster-type scanning pattern. The invention, however, is not limited to a particular type of scanning pattern. As one of ordinary skill in the art will appreciate upon reading this disclosure, other scanning patterns can be used in connection with the various embodiments of the present invention. By way of illustration and not by way of limitation, scanning can also proceed from left to right across one row of pixels, then in the opposite direction across the next lower row, and so forth in a serpentine pattern.

The location of each pixel 110 in the image field 112 can be described by Cartesian coordinates. Accordingly, in the embodiment of FIG. 1A, an arbitrary "$m^{th}$" pixel is designated as having location P(x,y). In the embodiment of FIG. 1A, pixel P(x,y), referred to herein as the $m^{th}$ pixel, is illustrated in the interior of the field 112. Because pixel P(x,y) is in the interior of the field 112, it has eight immediately-adjacent pixel neighbors, namely, P(x−1,y−1), P(x,y−1), P(x+1,y−1), P(x−1,y), P(x+1,y), P(x−1,y+1), P(x,y+1), and P(x+1,y+1).

As noted above, each pixel location in the above scanned image can be binary and/or multibit encoded, pixel by pixel, as part of a process of converting an image comprising a large number of gray or color levels to a reduced number of gray or color levels to render the image for display or output (hardcopy) on a printing system which is not able to accommodate the full range of gray-scale values. As noted above, the process of coding each pixel location inherently result in coding errors for each pixel location having a gray-scale value other than an end value on the gray-scale, e.g. 0 or 255.

A binary encoding error term ($e_{x,y}$) produced in halftoning a current pixel P(x,y), or $m^{th}$ pixel, can be diffused among one or more neighboring pixels, such as a $n^{th}$ pixel. This technique is generally referred to as error diffusion processes or systems.

The basic concept underlying error diffusion is to distribute, or diffuse, coding errors from the locations at which the errors arise. According to the Floyd Steinberg error diffusion technique, pixel input intensity values are modified by adding an error generated from thresholding previous pixels. With the encoding noted above, a threshold intensity value is established, typically at half scale in the gray-scale range, and is applied to an input intensity value detected for a given pixel. The thresholding process generates an output that is full scale (1) or zero scale (0) and the difference between the modified input pixel and the output is considered to be an error ($e_{x,y}$). This error ($e_{x,y}$) is split up and applied to surrounding pixels that have not yet been subject to the process.

Various method embodiments which follow are discussed in reference to the Floyd-Steinberg error diffusion process. The invention, however, is not limited to use with the Floyd-Steinberg error diffusion process.

In the Floyd-Steinberg error diffusion process, an error term ($e_{x,y}$) produced in halftoning the $m^{th}$ pixel P(x,y) can be diffused among pixels P(x+1,y), P(x+1,y+1), P(x,y+1), and P(x−1,y+1) according one or more weighting factors depending on the error diffusion scheme.

For example, for selected pixel neighbors of an $m^{th}$ pixel in an image, diffusing the calculated error value ($e_{x,y}$) of the $m^{th}$ pixel location to its selected neighbors is as follows:

$$E_n=(i \ w_n) \times (e_{x,y})$$

where $E_n$ is the error value diffused to the $n^{th}$ pixel neighbor from the $m^{th}$ pixel location, where the $n^{th}$ pixel neighbor is determined from a predetermined set of pixels neighboring the $m^{th}$ pixel, and where ($w_n$) is a weighting factor determined for the $n^{th}$ pixel location. The error diffusion process is continued for the other pixel neighbors of the $m^{th}$ pixel location. And, the error diffusion process is then continued for a next pixel location, e.g. an (m+1)th pixel location P(x+1,y) and so forth, such that coding errors are diffused from substantially all of the pixel locations in a scanned image. Images can then be printed by digital halftone printing based upon intensity values of pixel locations that have been modified by error diffusion.

Thus, in the Floyd-Steinberg error diffusion scheme, the calculated error value ($e_{x,y}$) of the $m^{th}$ pixel location to is diffused to its selected neighbors as follows:

$$P(x+1,y) \text{ receives } E_1=(w_1) \times (e_{x,y});$$

$$P(x+1,y+1) \text{ receives } E_2=(w_2) \times (e_{x,y});$$

$$P(x,y+1) \text{ receives } E_3=(w_3) \times (e_{x,y}); \text{ and}$$

$$P(x-1,y+1) \text{ receives } E4=(w_4) \times (e_{x,y});$$

It is noted here that the symbol (×) is intended to represent a product, or multiplication function.

The Floyd-Steinberg technique applies 7/16 of the error ($e_{x,y}$) to the next pixel to be processed on the current scan line. The rest of the error (9/16) is applied in a fixed manner to three adjacent pixels on the next succeeding scan line. The Floyd-Steinberg error weightings are pre-defined as $\{w_1=7/16, w_2=1/16, w_3=5/16, \text{ and } w_4=3/16\}$.

Figure 1B:
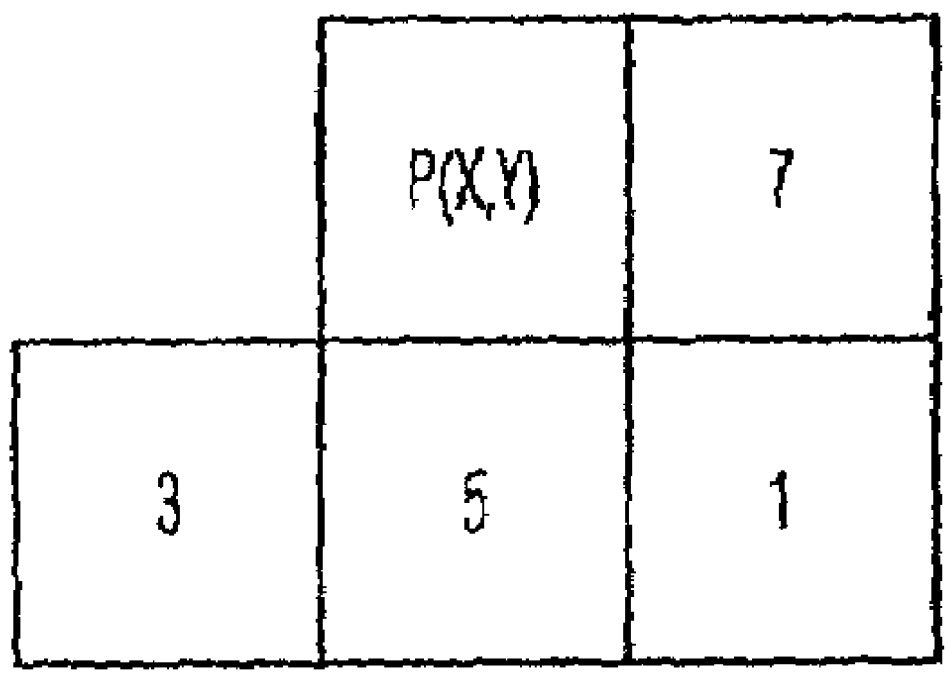
FIG. 1B illustrates a weighting factor embodiment for an error diffusion process according to the Floyd-Steinberg model.

This is illustrated in FIG. 1B in which P(x,y) represents the current pixel by Cartesian coordinates (x,y) within the image and the numbers indicate how much of the error ($e_{x,y}$) will be applied to each pixel (normalized to 16) with $w_1=7;$ $w_2=1;$ $w_3=5;$ $w_4=3;$ Therefore, $7/16^{ths}$ of the calculated total error ($e_{x,y}$) for pixel P(x,y) are diffused to pixel P(x+1,y), $1/16^{th}$ of the calculated total error ($e_{x,y}$) for pixel P(x,y) is diffused to pixel P(x+1,y+1), $5/16^{ths}$ to pixel P(x,y+1), and $3/16^{ths}$ to pixel P(x−1,y+1).

As a result of the coding error being diffused, e.g. the error diffuse values E1, E2, E3, and E4 being propagated, gray-scale values of pixel locations are increased, or decreased. For example, after error diffusion from the $m^{th}$ pixel P(x,y), the gray-scale value imputed to the location P(x+1,y) would be the detected gray-scale value z for that pixel P(x+1,y) plus the propagated error E1. Likewise, the gray-scale value imputed to the pixel located at P(x+1,y+1) would be the detected gray-scale value z for that pixel P(x+1,y+1) plus the propagated error E2. The effects of the error diffusion process on the pixel neighbors of $m^{th}$ pixel P(x,y) in this example can be summarized as follows:

$P'(x+1,y)=P(x+1,y)+E1;$ $P'(x+1,y+1)=P(x+1,y+1)+E2;$ $P'(x,y+1)=P(x,y+1)+E3;$ and $P'(x−1,y+1)=P(x−1,y+1)+E4.$ The primes indicate that the gray-scale values of the pixel locations are updated as a result of the above-described error diffusion process.

It should be emphasized that the above-described error diffusion process continues for each successively scanned pixel location. For example, as a result of the error diffusion process, a gray-scale value for a pixel located at P(x+4,y+5) will reflect the error propagated from its neighboring pixels located at P(x+3,y+4), P(x+4,y+4), P(x+5,y+4), and P(x+3,y+4). Also, the binary coding error propagated from the pixel location P(x+4,y+5) will reflect the errors propagated to that location from its set of neighboring pixels, and that error, in turn, will be diffused to the pixels located at P(x+5,y+5), P(x+5,y+6), P(x+4,y+6), and P(x+3,y+6). Although locations P(x+4,y+5), P(x+3,y+4), P(x+4,y+4), P(x+5,y+4), P(x+3,y+4), P(x+5, y+5), P(x+5,y+6), P(x+4, y+6), and P(x+3,y+6) are not expressly labeled in the pixel blocks 110 (for the sake of clarity), one or ordinary skill in the art will appreciate, with an understanding of the Cartesian coordinate scheme of field 112, the spatial relationship of such pixel locations to those which are expressly labeled.

As noted above, the various embodiments of the present invention equally apply to error diffusion in multi-color halftoning processes. In embodiments for error diffusion in multi-color halftoning, a field 112, such as illustrated in the embodiment of FIG. 1A can be sequentially scanned with different color filters or, alternatively, can be scanned once with each picture element having multiple exposures, with different filters. For each of the selected colors and each of the pixel locations in the scanned field 112, binary coding errors are diffused as described herein.

The following several paragraphs concentrate on describing one particular error diffusion method that has a random weighting scheme for error diffusion terms, e.g. E1, E2, E3, and E4. The same is provided, by way of example and not by way of limitation, to illustrate another dynamic error diffusion process in connection with which embodiments of the invention can be implemented.

FIGS. 2A–2D illustrates other dynamic weighting factor embodiments for error diffusion processes. The embodiments presented in FIGS. 2A–2D involve randomizing the weighting factors. In the embodiments shown in FIGS. 2A–2D a calculated error value for image pixels having intensity values between predetermined threshold values are divided into eight parts that are distributed to four pixel neighbors of an $m^{th}$ pixel, e.g. pixel P(x,y). Specifically, 4/8 of the error is diffused to one of the pixel neighbors, 1/8 of the error is diffused to a second pixel neighbor, 2/8 of the error is diffused to a third pixel neighbor, and 1/8 of the error is diffused to a fourth pixel neighbor.

In the embodiments of FIGS. 2A–2D, the weighting factors themselves are randomly shifted among neighboring pixels. That is, a random selection can be made of one of the predetermined set of weight values (4/8, 1/8, 2/8, 1/8) as a starting weight value. The starting weight value is assigned to a predetermined one of the pixel neighbors. Based on the starting weight value, the process then involves selecting other weight values in an ordered fashion from the predetermined set of weight values until all the predetermined weight values have been selected and assigned.

Thus, in the embodiment of FIG. 2A, a weighting factor 4 (normalized by 8) has been randomly selected as the starting weight value and has been assigned to pixel P(x+2, y). The other weight values, selected in order, are then assigned; weight value 1 to pixel P(x−1, y+1), weight value 2 to pixel P(x, y+1), and weight value 1 to pixel P(x+1, y+1).

In the embodiment of FIG. 2B, a weighting factor 1 (normalized by 8) has been randomly selected as the starting weight value and has been assigned to pixel P(x+2, y). The other weight values, selected in order, are then assigned; weight value 2 to pixel P(x−1, y+1), weight value 1 to pixel P(x, y+1), and weight value 4 to pixel P(x+1, y+1).

In the embodiment of FIG. 2C, a weighting factor 2 (normalized by 8) has been randomly selected as the starting weight value and has been assigned to pixel P(x+2, y). The other weight values, selected in order, are then assigned; weight value 1 to pixel P(x−1, y+1), weight value 4 to pixel P(x, y+1), and weight value 1 to pixel P(x+1, y+1).

In the embodiment of FIG. 2D, a weighting factor 1 (normalized by 8) has been randomly selected as the starting weight value and has been assigned to pixel P(x+2, y). The other weight values, selected in order, are then assigned; weight value 4 to pixel P(x−1, y+1), weight value 1 to pixel P(x, y+1), and weight value 2 to pixel P(x+1, y+1).

As one of ordinary skill in the art will appreciate, FIGS. 1A–2D are presented to illustrate the operation and nature of various error diffusion systems. Embodiments of the present invention, as described in more detail below, can be used in connection with such dynamic error diffusion systems. As one of ordinary skill in the art will appreciate, there are many different error diffusion techniques which exist. However, the existing and above described error diffusion systems do not treat overflow error from the individual error diffusion terms in hardware implementations. This is explained in more detail in the paragraphs which follow. The invention is not limited to use in any particular error diffusion system.

Many applications depend upon fast and efficient hardware implementations to accommodate the above described error diffusion processes. Hardware division operations such as are involved with the weighting factors presented above, are costly on throughput. Accordingly, hardware error diffusion implementations favor an arithmetic shifting operation. To perform the arithmetic shifting operation, hardware error diffusion implementation use error diffusion weightings of the fractional form $A/2^N$. Using a power of two (2) as the denominator of the fraction allows the division part of the error diffusion calculation to be accomplished with an efficient arithmetic shifting operation. Dividing by $2^N$ is equivalent to shifting to the right by N in hardware systems. The "A" term is a variable representing the numerators for the weighting values in a given error diffusion scheme.

Unfortunately, this method of calculating the error diffuse terms lends itself to having a fractional unused portion of the error diffuse term, referred to herein as "overflow error," that is generated when calculating the individual error diffuse terms. Truncation or rounding of the overflow error can lead to the loss of information in the error diffusion process.

To illustrate, in an 8-bit pixel Floyd-Steinberg error diffusion system, the arithmetic shifting operation to perform the division part of the diffuse error calculation involves shifting to the right by 4. That is, the denominator of the weighting factor in Floyd-Steinberg system is 16. Using a power of 2 as the denominator, shifting to the right by 4 equates to dividing by 16, e.g. $2^4=16$. In the Floyd-Steinberg example, shifting to the right by four (4) results in removing the lower four bits of gray-scale information. By way of illustration and not by way of limitation, the dynamic error diffusion process presented in connection with FIGS. 2A–2D has a denominator weighting factor of 8. Again using a power of 2 as the denominator, shifting to the right by 3 equates to dividing by 8, e.g. $2^3=8$. Here, shifting to the right by three (3) results in removing the lower three bits of gray-scale information. As one of ordinary skill in the art will appreciate, the arithmetic shift right operation can be represented by the ">>".

The lower three or four bits, however, represent a fractional unused portion of the error term, referred to herein as "overflow error," that is generated when calculating the individual diffuse error terms $(E_n)$. Truncation or rounding the overflow error results in lost gray-scale information.

The Floyd-Steinberg error diffusion process, whose weighting factors are of the form x/16, has the potential of discarding $^{15}/_{16}$ths (the largest fraction of 16) of overflow error per error diffused term $(E_n)$ if truncation is used on the overflow error. By way of illustration and not by way of limitation, the following example is provided for a pixel location P(x,y) having a detected or modified input intensity value of z=41. As described herein, the pixel location will have an encoding error term of $(e_{x,y})=41$ (since, $e_{x,y}=z$ for z<T). Pixel P(x,y) is the pixel currently being error diffused. The error term $(e_{x,y})=41$ for pixel P(x,y) will be split up into individual error diffusion terms $(E_n)$ to be distributed to neighbor pixels according to one or more weight factors. In the Floyd-Steinberg error diffusion system the error diffusion term $E_{(x+1,y)}$ will have a weighting factor of $^7/_{16}$.

Therefore the error diffusion term $E_{(x+1,y)} = ^{287}/_{16} \times 41 = ^{287}/_{16}$, (since, $E_n = (w_n) \times (e_{x,y})$). This error diffusion term calculation produces a value of 17.9375.

However, in a hardware implementation of the Floyd-Steinberg process, the arithmetic shifting operation to perform the division part of the error diffusion calculation involves shifting to the right by 4. This equates to shifting out the lower 4 bits of the product of the error weight numerator and pixel error and keeping the remaining bits. In effect, a truncation is performed discarding the shifted out bits. As a result, four bits of pixel information, equating to the gray-scale pixel information value 0.9375, is lost. The value 0.9375 equals $^{15}/_{16}$ths and represents the fractional unused portion of the error term, referred to herein as "overflow error," that is generated when calculating the individual error diffusion terms $(E_n)$. Thus, in accord with what was stated above, the potential overflow discarded per error diffuse term, $(E_n)$ is $^{15}/_{16}$. Since there are four error diffusion terms $(E_1, E_2, E_3,$ and $E_4)$ in Floyd-Steinberg error diffusion systems, the potential overflow error lost, or discarded, can be up to $4 \times (^{15}/_{16})$ $^{60}/_{16}=3.75$ gray-scale values worth of pixel information per error diffused pixel.

In hardware implementations which use rounding to account for the overflow error, the individual error diffused terms are rounded to the nearest whole number. In hardware implementations this is accomplished by adding 0.5 to the individual error diffused terms and then truncating. In the above example, 0.5 would be added to the overflow error 0.9375 value and then the shifting operation, e.g. truncating operation, would be performed. Hence, the 0.9375 value would become 1.4375 and the shifting operation would remove or discard the 0.4375 value adding 1.0 gray-scale unit value to the fifth pixel bit. An over-amount of gray density is added to the image in this example, e.g. 1.0 gray-scale unit is added when the true value was 0.4375 gray-scale units.

With rounding, the potential overflow error discarded per diffuse error term $(E_n)$ is approximately 0.5 gray-scale units. That is, if the lower four pixel bits have a value of 0.49, then once 0.5 is added the lower four pixel bits will have a value of 0.99. As one of ordinary skill in the art will appreciate, the fifth pixel bit is not affected. The truncation, or shifting operation, will remove the lower four pixel bits (now having a value of 0.99) leaving a value of the fifth pixel bit unchanged. This results in the original 0.49 gray-scale values worth of pixel information being lost.

In Floyd-Steinberg error diffusion systems (having 4 error diffusion terms) the potential overflow error lost, or discarded, through rounding can be up to $4 \times (^1/_2)$ or 2.0 gray-scale values worth of pixel information per error diffused pixel. Again, the number is magnified as the error diffusion process proceeds pixel-to-pixel through an image.

One of ordinary skill in the art will appreciate that for a 600×600 dots per inch (dpi), 8.5"×11", image to be printed using error diffusion, assuming a print area of 8.0"×10.5", approximately $30 \times 10^6$ pixels will be error diffused. Ignoring or discarding the fractional unused portion of the error term when calculating individual error diffusion terms can affect the encoding decision, e.g. "turn on" (binary 1) or "turn off" (binary zero), for many pixels and result in lost gray density. Other error diffusion systems, e.g. Jarvis and/or Stucki error diffusion systems as the same will be understood by one of ordinary skill in the art, propagate error diffusion terms to an even greater number of neighboring pixels than performed in the Floyd-Steinberg technique. Therefore, in these error diffusion systems the potential information lost due to rounding errors at each error diffused pixel can be even greater.

Method Embodiments

In various embodiments of the invention, methods are provided to diffuse overflow error, leftover from the individual error diffusion term calculations ($E_n$), in a pseudo-random manner. In some embodiments, methods are provided to diffuse the overflow error, leftover from the individual error calculations ($E_n$), in a pseudo-random manner that takes into account the originally specified error weightings ($w_n$). Other various embodiments calculate the overflow error, leftover from the individual error calculations ($E_n$), and stochastically distribute it to at least one neighboring pixel with each neighbor candidate recipient having an equal probability.

Various method embodiments are now presented. As one of ordinary skill in the art will understand, the methods can be performed by software, application modules, and computer executable instructions operable on the systems and devices shown herein or otherwise. The invention, however, is not limited to any particular operating environment or to software written in a particular programming language. Unless explicitly stated, the methods described below are not constrained to a particular order or sequence. Additionally, some of the so described methods can occur or be performed at the same point in time.

The various embodiments of the present invention compute the overflow error (OF), leftover from the individual error diffusion term calculations ($E_n$), and diffuse accumulated overflow error from each of individual error diffusion term calculations ($E_n$) to one or more pixel neighbors in a pseudo-random manner. The following variables are defined for reference herein.

TE=total error (equates to ($e_{x,y}$) described above) to be diffused for a current pixel undergoing error diffusion, e.g. an $m^{th}$ pixel.

W1=weight 1, numerator of error weighting 1 for a first error diffusion term recipient W2=weight 2, numerator of error weighting 2 for a second error diffusion term recipient W3=weight 3, numerator of error weighting 3 for a third error diffusion term recipient W4=weight 4, numerator of error weighting 4 for a fourth error diffusion term recipient E1=propagated error diffusion term 1, e.g. propagated to a first pixel neighbor E2=propagated error diffusion term 2, e.g. propagated to a second pixel neighbor E3=propagated error diffusion term 3, e.g. propagated to a third pixel neighbor E4=propagated error diffusion term 4, e.g. propagated to a fourth pixel neighbor It is noted from above, that propagated error diffusion values, e.g. E1, E2, E3, and E4, can be either positive or negative depending on a given pixel's gray-scale value (z) in relation to one or more threshold values (T). It is noted that in various embodiments more and/or fewer than four (4) error recipient pixels, with their respective weighting factors and error propagation terms, can be involved in various error diffusion schemes. However, for ease of illustration and in reference to the Floyd-Steinberg error diffusion scheme, four are described. It is further noted that the description herein refers in places to neighbor pixels as error diffusion term recipient pixels. As used herein, the term "neighbor" is not intended to be restricted to immediately adjacent pixel's to a given $m^{th}$ pixel. That is, in some embodiments, the scope of the term "neighbor pixel" is intended to include all pixels within an image.

As explained in detail above, hardware implementations often favor an arithmetic shifting operation over a division operation. That is, hardware division operations are costly on throughput. Accordingly, hardware error diffusion implementations generally use error diffusion weightings of the fractional form $A/2^N$. As noted above, dividing by $2^N$ is equivalent to shifting to the right by N in hardware systems. In this example, the A term, or numerator will be one of the weighting values, W1, W2, W3, W4 respectively. In the Floyd-Steinberg example, shifting to the right by four (4), e.g. removing the lower four bits, is equivalent to dividing by 16.

According to various embodiments of the present invention, the propagated error values, e.g. E1, E2, E3, and E4, can be further represented, defined or expressed as follows to reflect the aforementioned shifting operation.

$$E1=(TE \times W1) >> 4$$

$$E2=(TE \times W2) >> 4$$

$$E3=(TE \times W3) >> 4$$

$$E4=(TE \times W4) >> 4$$

That is, the expression (>>4) reflects the operation of shifting to the right by 4, the equivalent to dividing by 16.

By way of illustration and not by way of limitation, an accumulated or total overflow error (TOF) in various embodiments is the sum of the 4-bit values shifted out in each error diffusion term calculation, e.g. E1, E2, E3, and E4. According to various embodiments of the present invention, the individual overflow error ($OF_n$) shifted out of the propagated error values, e.g. E1, E2, E3, and E4, can be expressed as:

OF1=overflow error of error diffusion term E1
OF2=overflow error of error diffusion term E2
OF3=overflow error of error diffusion term E3
OF4=overflow error of error diffusion term E4

The 4-bit values shifted out are the 4 least significant bits of the original total error TE and weight, e.g. W1, W2, W3, W4, product. This 4-bit fractional "overflow error" represents the numerator of the remainder of the original divide-by-16 operation.

Computing Overflow Error

According to various embodiments of the present invention, these 4-bit overflow errors can be isolated from each error diffusion term, e.g. E1, E2, E3 and E4, by doing a logical AND operation (&) with the original total error TE and weight, e.g. W1, W2, W3, W4, product and converting to hexadecimal (0x F). As one of ordinary skill in the art will appreciate, 0x F is the hexadecimal representation of the binary number 1111 which accords with isolating the lowest four bits.

Thus, herein, the individual overflow error ($OF_n$) shifted out of the propagated error values, e.g. E1, E2, E3, and E4, can be further represented, defined, or expressed as follows to reflect the above mentioned separation or isolation.

$$OF1=(TE \times W1) \& 0 \times F$$

$$OF2=(TE \times W2) \& 0 \times F$$

$$OF3=(TE \times W1) \& 0 \times F$$

$OF4=(TE \times W1) \& 0 \times F$

In various embodiments of the present invention, an accumulated or total overflow error (TOF) can be computed and calculated as follows. The individual overflow errors, OF1, OF2, OF3, and OF4 are summed. The sum of the individual overflow errors (OF1+OF2+OF3+OF4) is then divided by 16 (in the Floyd-Steinberg example). That is, in the Floyd-Steinberg example, TOF_FRACTION=(OF1+OF2+OF3+OF4)/16. Again, in hardware implementations the division can be achieved by shifting to the right by 4. In various embodiments, the accumulated or total overflow error is computed and calculated as;

$TOF=(OF1+OF2+OF3+OF4) >> 4.$

In the various embodiments, the TOF value further involves a rounding. In order to round, the value $8/16$ (e.g. 0.5) is added to the sum (OF1+OF2+OF3+OF4). This is equivalent to adding the value 8 to a numerator value and shifting to the right by 4. As one of ordinary skill in the art will understand upon reading this disclosure, this embodiment the accumulated or total overflow error is computed and/or calculated as;

$TOF\_FRACTION=ROUND((OF1+OF2+OF3+OF4)/16)$ $TOF=((OF1+OF2+OF3+OF4+8) >> 4)$

By way of illustration and not by way of limitation, an example of the above described embodiment operations (with and without rounding) will now be presented for a particular total error term to be diffused for a particular pixel, such as P(x,y). In this example a total error term $(e_{x,y})$ of 41 will be used, e.g. TE=41. From the expressions given above $OF1=(41 \times 7) \& 0 \times F=15$ The value 15 represents 41×7=287 converted to hexadecimal (hex) with the lower four bits extracted and converted back to decimal. That is, the hexadecimal value for 287 is 0×11F. The lower four bits are represented by the hexadecimal symbol F. Hex F has a decimal value of 15. The same procedure is followed to calculate the overflow error for each propagated error term. Thus, $OF2=(41 \times 1) \& 0 \times F=9$ $OF3=(41 \times 5) \& 0 \times F=13$ $OF4=(41 \times 3) \& 0 \times F=11$ Without rounding, $TOF\_FRACTION=(15+9+13+11)/16=40/16$ $TOF=40>>4$ $TOF=2.0$ gray-scale units (40/16=2.5, but $TOF=2.0$ since the 0.5 is truncated)

With rounding, $TOF\_FRACTION=ROUND(15+9+13+11)/16=ROUND(40/16)$ $TOF=(15+9+13+11+8)>>4$ $TOF=48>>4$ TOF=3 gray-scale units Overflow Error Diffusion According to various embodiments of the present invention, accumulated or total overflow error (TOF) per error diffused pixel is pseudo-randomly distributed to one or more neighbor pixels of the error diffused pixel. An embodiment for pseudo-randomly distributing the TOF includes using a pseudo-random number generated by a random number generator and thresholding the TOF to assign the TOF to one or more pixel neighbors in a manner that takes into account the originally specified error weightings ($w_n$) used to assign error diffusion terms. Another embodiment includes using a pseudo-random number generated by a random number generator and thresholding the TOF to assign the TOF to one or more pixel neighbors with each recipient pixel candidate having an equal probability. Examples are given below, however, the invention is not limited to the example embodiments presented.

An embodiment example for assigning the TOF to one or more pixel neighbors in a manner that takes into account the originally specified error weightings ($w_n$) used to assign error diffusion terms includes the following. A pseudo-random number is generated by a random number generator, such as a linear feedback shift register (LFSR). The value of the so generated pseudo-random number can be expressed as LFSR_val. In various embodiments, a lower four bits of the random number (LFSR_val) are chosen. Herein, this can be represented, defined or expressed as LFSR_mod. Using the same techniques described above, a hardware implementation can perform a shift right by four operation on LFSR_val and then isolate those lower four bits. In this example, LFSR_mod=LFSR_val mod 16. "mod 16" indicates modulo 16, or the remainder of dividing LFSR_val by 16. Since 16 is an integer of the form $2^N$, the modulo operation can be performed by isolating the lower N bits of LFSR_val through an arithmetic shifting operation.

As one of ordinary skill in the art will appreciate, an N shift to the right is performed depending on the power of 2, e.g. $2^N$, being used in a given error diffusion scheme. In the Floyd-Steinberg model, 16 is the denominator of the error weightings. Thus, implementation of this embodiment with a Floyd-Steinberg error diffusion process will use a shift right by four operation, $2^4=16$.

Next, in this embodiment, the value (LFSR_mod) of the lower four bits can be compared to the original error weightings, W1, W2, W3, and W4, (in the Floyd-Steinberg example) in order to determine to which neighboring pixel to diffuse the accumulated or total overflow error TOF, e.g. the value TOF=3 with rounding from the above example.

In the Floyd-Steinberg error diffusion process the error weighting factors are 7/16, 1/16, 5/15 and 3/16 or, numerator weightings, W1=7, W2=1, W3=5, and W4=3. From above, LFSR_mod is the lowest four bits of the pseudo-random number. These pseudo-random four bits will have a value from 0–15. In various embodiments, this pseudo random LFSR_mod value is compared to the numerator of the weighting factors, e.g. 7, 1, 5, and 3, while successively adding the numerators, e.g. 7, 7+1=8, 7+1+5=13, and 7+1+5+3=16. Thus, the pseudo random LFSR_mod value is compared first to a value of 7, a value of 8, a value of 13, and a value of 16 and the TOF can be assigned to a pixel associated with one of these weighting factor comparisons accordingly.

By way of illustration and not by way of limitation, if the LFSR_mod value is less than 7, then the TOF is assigned to the neighbor pixel associated with the weighting factor 7. If TOF is not assigned, then the LFSR_mod value is next compared to the sum of the numerators for the first weighting factor and the next weighting factor (W1+W2). That is, LFSR_mod is compared to 8 and if the LFSR_mod value is less than 8, then the TOF is assigned to the neighbor pixel associated with the second weighting factor 1. If TOF is still not assigned, then the LFSR_mod value is next compared to the sum of the numerators for the first three weighting factors (W1+W2+W3). That is, LFSR_mod is compared to 13 and if the LFSR_mod value is less than 13, then the TOF is assigned to the neighbor pixel associated with the third weighting factor 5. Finally, using the Floyd-Steinberg error weighting system example, the LFSR_mod value is compared to the sum of the numerators for the first four weighting factors (W1+W2+W3+W4). That is, LFSR_mod is compared to 16 and if the LFSR_mod value is less than 16, then the TOF is assigned to the neighbor pixel associated with the fourth weighting factor 3.

Alternatively, if this was the last comparison, then the TOF could have outright been assigned to the pixel association with the fourth weighting factor. This particular scheme can be expressed as follows.

```
if (LFSR_mod < W1) then
    add TOF to East pixel;
elsif (LFSR_mod < (W1+W2)) then
    add TOF to SouthEast pixel;
elsif (LFSR_mod < (W1+W2+W3)) then
    add TOF to South pixel;
else
    add TOF to South West pixel;
```

One of ordinary skill in the art will appreciate upon reading this disclosure, that many variants on the above methodology for pseudo-randomly, or stochastically assigning the accumulated overflow error in a manner that factors in the original error weightings are considered within the scope of the present invention. That is, many possible variations on error weighting schemes, including many different error weighting factor distributions and values, are considered within the scope of the present invention for determining which neighbor pixel receives the overflow error. Again, one of ordinary skill in the art will appreciate, an N shift to the right is performed depending on the power of 2, e.g. $2^N$, being used in a given error diffusion scheme in order to derive the LFSR_mod value. In the various embodiments, the above described thresholding procedure essentially diffuses the overflow error to a particular neighbor pixel with a probability defined by the original error weights.

Another embodiment for pseudo-randomly distributing the TOF includes using the pseudo-random number generated by a random number generator, such as the LFSR mentioned above, and thresholding it in a manner which does not factor in the original error weights, but rather gives each possible pixel neighbor, or pixel recipient candidate, an equal chance of receiving the overflow error. In this embodiment, the number of lower bits which are extracted from the pseudo-random number is reflective of the number of pixel neighbors which are candidates for receiving the overflow error. To illustrate, by way of example and not by way of limitation, the Floyd-Steinberg error diffusion process assigns weights of the original total error from an error diffused pixel to four neighbor pixels. In various embodiments then, these four pixels are the candidate recipients. Since in the Floyd-Steinberg example there are four possible neighbor pixels, two bits of the LFSR value (for example, a pseudo-random value that ranges from 0 to 3, e.g. 00, 01, 10, and 11) can be used to determine assignment of the overflow error. That is, each two bit value, or combination, can be assigned to one of the four candidate recipient pixels. This embodiment gives each candidate recipient an equal chance of receiving the overflow error, e.g. a 25% chance using the Floyd-Steinberg example. This particular scheme can be expressed as follows.

```
LFSR_mod = LFSR_val & 0x3    // isolate least significant two bits
if (LFSR_mod == 00) then
    add TOF to East pixel;
elsif (LFSR_mod == 01) then
    add TOF to SouthEast pixel
elsif (LFSR_mod == 10) then
    add TOF to South pixel
else
    add TOF to SouthWest pixel
```

As one of ordinary skill in the art will appreciate, the number of candidate recipient pixels can be many more than four and thus more bits would then be used from the pseudo-random number value. The same is considered within the scope of the present invention. In various embodiments, a bit length, or number of bits, from the pseudo-random number is chosen to accommodate all possible candidate recipient pixels, e.g. if the total number of candidate recipient pixels is eight (8), then a bit length of three (3) bits is chosen. Since $2^3=8$, enough bit combinations can be provided to distinctly designate each of the candidate recipient pixels.

FIGS. 3–6 are block diagrams illustrating various method embodiments of the invention. As one of ordinary skill in the art will understand, the methods can be performed by software, application modules, and/or computer executable instructions operable on the systems and devices shown herein or otherwise. The invention, however, is not limited to any particular operating environment or to software written in a particular programming language. Unless explicitly stated, the methods described below are not constrained to a particular order or sequence. Additionally, some of the so described methods can occur or be performed at the same point in time.

Figure 3:
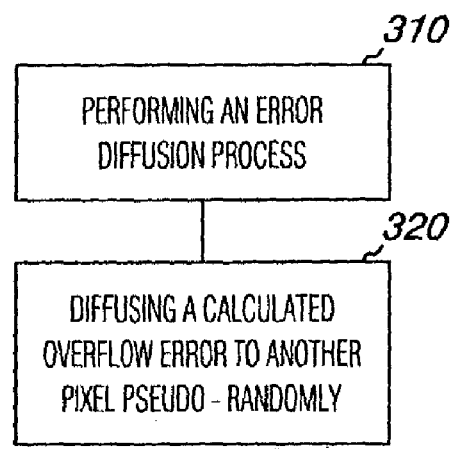
FIG. 3 illustrates a method embodiment for image processing.

FIG. 3 illustrates a method embodiment for image processing. As illustrated in the embodiment of FIG. 3, the method includes performing an error diffusion process at block 310. The method includes diffusing a calculated overflow error to another pixel pseudo-randomly at block 320 according to one or more of the techniques described herein.

Figure 4:
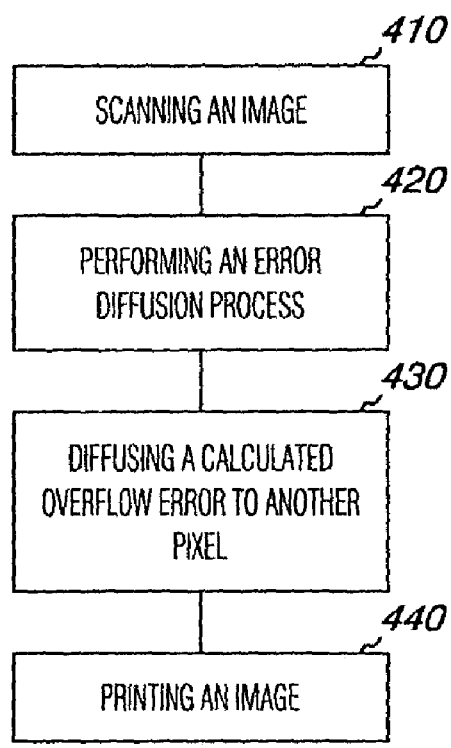
FIG. 4 illustrates a method embodiment for halftoning.

FIG. 4 illustrates a method embodiment for halftoning. As illustrated in the embodiment of FIG. 4, the method includes scanning an image at block 410. At block 420, the method includes performing an error diffusion process. The method further includes diffusing a calculated overflow error term to another pixel at block 430. As one of ordinary skill in the art will understand upon reading this disclosure, diffusing a calculated overflow error term to another pixel at block 430 includes diffusing a calculated overflow error term to another pixel in accordance with the various embodiments described above. At block 440, the method includes printing an image. As one of ordinary skill in the art will appreciate upon reading this disclosure, printing an image includes printing an image by digital halftone printing based upon intensity values of pixel locations that have been modified according to the various embodiments described herein.

Figure 5:
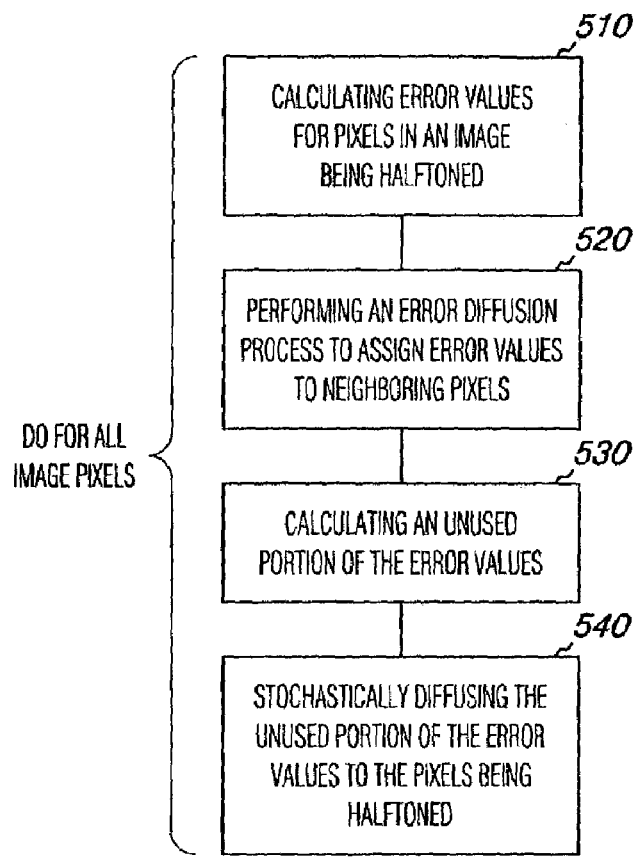
FIG. 5 illustrates a method embodiment for error diffusion.

FIG. 5 illustrates a method embodiment for error diffusion. As illustrated in the embodiment of FIG. 5, the method includes calculating error values for pixels in an image being halftoned at block 510. At block 520, the method includes performing an error diffusion process to assign error values to neighboring pixels. The method further includes calculating a fractional, unused portion of the error values at block 530. As one of ordinary skill in the art will appreciate upon reading this disclosure, calculating an unused portion of the error values includes calculating the overflow error for one or more propagated error diffuse terms and/or a total overflow error in accordance with the various embodiments described above. At block 540, the method includes stochastically diffusing the unused portion of the error values to the pixels being halftoned. As one of ordinary skill in the art will appreciate upon reading this disclosure, stochastically diffusing the unused portion of the error values includes stochastically diffusing the unused portion of the error values according to the various embodiments which have been presented herein. Further, as shown in the embodiment of FIG. 5, the method includes performing the methods described in blocks 510 through 540 for all pixels in an image.

Figure 6:
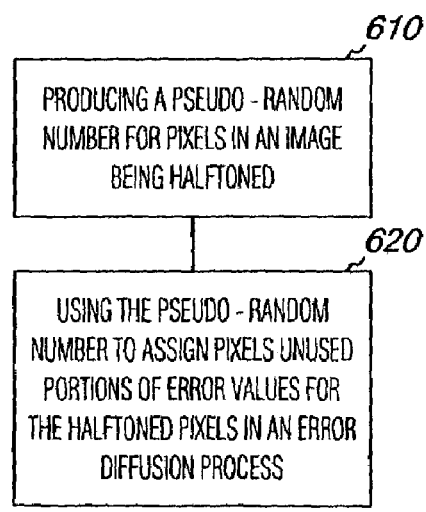
FIG. 6 illustrates a method embodiment for overflow error diffusion.

FIG. 6 illustrates a method embodiment for overflow error diffusion. As shown in the embodiment of FIG. 6, the method includes producing a pseudo-random number for pixels in an image being halftoned at block 610. As one of ordinary skill in the art will appreciate upon reading this disclosure, producing a pseudo-random number for pixels in an image being halftoned includes producing a pseudo-random number in accordance to the various embodiments described herein. At block 620, the method includes using the pseudo-random number to assign pixels unused portions of error values for the halftoned pixels in an error diffusion process. Again, as one of ordinary skill in the art will appreciate upon reading this disclosure, using the pseudo-random number to assign to pixels unused portions of error values includes using the pseudo-random number to assign to pixels fractional, unused portions of error values according to the teachings of the various embodiments described herein.

Hence, various embodiments of the present invention include methods that add the overflow error to one of the neighbor pixels of a pixel being error diffused in a pseudo-random manner. One embodiment of the invention factors in the original error weights for diffusing the original total error when determining which neighbor pixel receives the overflow error. Another embodiment gives each neighbor an equal chance at receiving the overflow error. The invention, however, is not so limited.

A pseudo-random number is generated from a pseudo-random number, such as linear feedback shift register (LFSR), for each pixel being error diffused. This pseudo-random number is then compared to either the original error weights defined for diffusing the original total error for the current pixel or is compared to a set of values that would give each pixel neighbor an equal probability of being selected. The result of this comparison determines which neighbor pixel will receive the overflow error.

Device and System Embodiments

Figure 7:
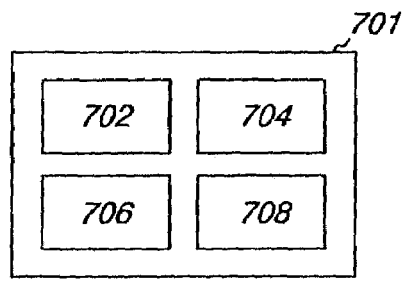
FIG. 7 illustrates an embodiment for a digital halftone processor operable with various implementations of the present invention.

FIG. 7 illustrates an embodiment for a digital halftone processor 701 operable with various implementations of the present invention. In the embodiment of FIG. 7, the digital halftone processor is illustrated including an encoder 702 operable to encode one or more pixel locations with a modified pixel density value as the same will be know and understood by one of ordinary skill in the art. In the embodiment of FIG. 7, the digital halftone processor is illustrated including a diffuser 704 operable to perform error diffusion according to one or a number of error diffusion processes and/or systems as the same have been described herein. In the embodiment of FIG. 7, the digital halftone processor is illustrated including an overflow filter 706 operable to compute and/or calculate overflow error as the same has been described herein. And, in the embodiment of FIG. 7, the digital halftone processor is illustrated including a pseudo-random generator 708 operable to generate a pseudo-random number as the same will be known and understood by one of ordinary skill in the art. In some embodiments, by way of example and not by way of limitation, the pseudo-random generator 708 can include a linear feedback shift register (LFSR). As one of ordinary skill in the art will appreciate upon reading this disclosure, embodiments of the invention are not limited to implementation in or with a digital halftone processor 701 configured according to the embodiment of FIG. 7. Other digital halftone processors including more or fewer components than those shown in the embodiment of FIG. 7 are considered within the scope of the present invention.

Embodiments of the digital halftone processor 701 can include a combination of hardware and software and includes a hardware implementation capable of performing error diffusion in accordance with the description herein. The components presented above are operable with a pseudo-random generator 708 to stochastically diffuse overflow error, leftover from the individual error diffusion term calculations ($E_j$), to neighbor pixels. In order to reduce artifacts, a repeated sequence of pixels receiving overflow error diffusion should not line up near one another on successive lines of an image. In various embodiments, a repeated sequence can be reduced by using a long register. For example, a 32-bit shift register, with feedback, will result in a unique number which repeats after 4 million numbers. In some embodiments, the lowest 2 bits in a randomly generated number are used to stochastically diffuse the overflow error to neighbor pixels of a pixel being error diffused. In some embodiments, the lowest 4 bits in the randomly generated number are used to stochastically diffuse the overflow error to neighborhood pixels. The invention, however, is not so limited and one of ordinary skill in the art will recognize that other bit lengths and/or groupings as well as other random generator types can be used to implement embodiments of the present invention.

Figure 8:
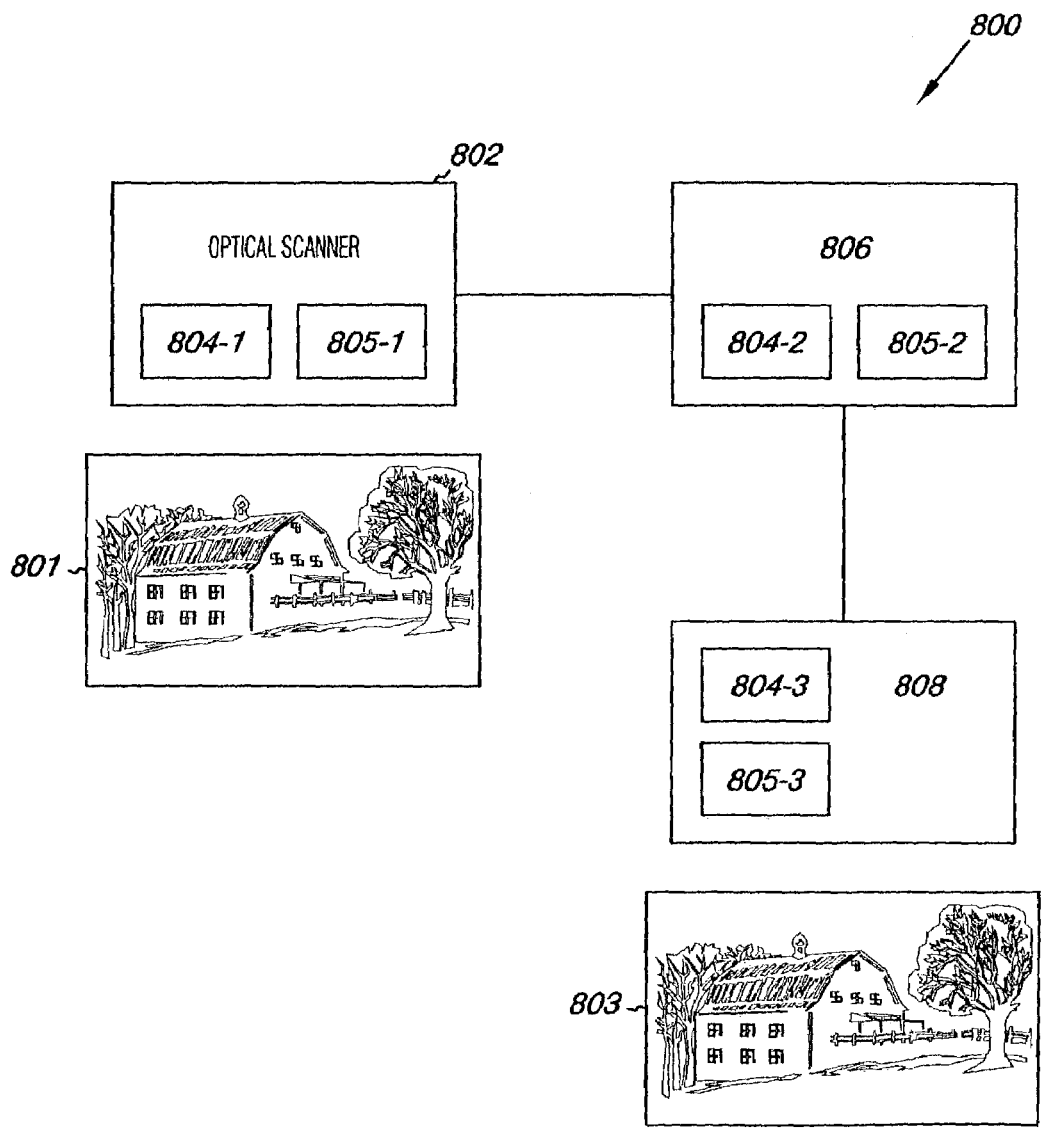
FIG. 8 illustrates an embodiment of a system for digital halftone printing.

FIG. 8 illustrates an embodiment of a system 800 for digital halftone printing in which various embodiments of the invention can be implemented. In the embodiment of FIG. 8, system 800 includes an optical image scanner 802, a computer 806, and a printer 808. One of ordinary skill in the art will appreciate that the various components, 802, 806, and 808, can be networked across a distributed computing environment in a hardwired and/or wireless manner. The invention is not so limited. One of further skill in the art will further appreciate that one or more of the various components, 802, 806, and 808, can be included in a multifunction electronic device.

For example, Hewlett Packard produces several devices that provide printing, copying, scanning. Some of these devices also include faxing. This type of device is generally referred to as a PCS (Printing/Copying/Scanning) device even though some devices might also include faxing or other capabilities. These multi-function devices are also referred to as All-in-One (AiO) devices.

Accordingly, in the embodiment of FIG. 8, each of the various components is illustrated as including a digital halftone processor, e.g. 804-1, 804-2, and 804-3 respectively, to indicate that a digital halftone processor, such as described in connection with FIG. 7, can be included in one or more of various stand-alone components, 802, 806, and 808, or within a multifunction device. Similarly, in the embodiment of FIG. 8, each of the various components, 802, 806, and 808, is illustrated as including a computer readable medium, 805-1, 805-2, and/or 805-3 respectively, on which a set of computer executable instructions can reside, to indicate that one of many forms of computer readable media, e.g. Flash memory, RAM, ROM, DDRAM, magnetic media, optically read media, and the like, can be included in one and/or all of the various stand-alone components, 802, 806, and 808, or within a multifunction device.

As one of ordinary skill in the art will understand upon reading this disclosure, various method embodiments of the invention can be performed by software, application modules, and computer executable instructions operable on the systems, devices, and digital halftone processors, shown herein or otherwise, as part of an overflow error diffusion process or system. The invention, however, is not limited to any particular operating environment or to software written in a particular programming language.

As one of ordinary skill in the art will appreciate upon reading this disclosure, software, application modules and/or computer executable instructions, suitable for carrying out embodiments of the present invention, can be resident in one or more devices or locations or in several and even many locations, such as in a distributed computing environment, throughout a system as shown above.

By way of illustration and not by way of limitation, one embodiment of operation for the system embodiment 800 illustrated in FIG. 8 can include the following. The scanner 802 digitizes an image from a medium 801, such as a photographic transparency, a photographic print, or a high-resolution printed original, so that the picture elements (i.e., pixels) of the original image are digitized to gray-scale values. Those skilled in the art will recognize that in order to process color images the scanner 802 will also make color separations of the image. The digitized values can be provided to the computer 806 or directly to the printer 808. Within the system 800, the digital information can be processed and operate on to perform overflow error diffusion according to the various embodiments described herein. Processed images can be provided to the printer 808 for printing onto a sheet 803 according to the various embodiments described herein.

When the system embodiment 800 of FIG. 8 is operated in accordance with embodiments of the present invention, the digital image information that is provided to a digital halftone processor, 804-1, 804-2, 804-3, is encoded, is operated upon according to any of a number of dynamic error diffusion halftoning process, such as the Floyd-Steinberg error diffusion process/system and the like, and the overflow error, leftover from the individual error calculations ($E_j$) in the error diffusion process, is stochastically diffused to neighborhood pixels prior to printing.

Accordingly, a treatment of overflow error in efficient hardware error diffusion systems is provided which reduces the loss of gray-scale information in digital halftoning processes. The stochastic nature of the selection of the neighborhood pixel that receives the overflow error makes the overflow error distribution process resistant to forming periodic structures or patterns. And, various embodiments of the invention work on a per pixel basis, and therefore can support error diffusion algorithms that use dynamic error diffusion filters and error diffusion filters of different size.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods can be used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for error diffusion, comprising:
    calculating error values, $e_m$, corresponding to differences between modified intensity values for a number of pixel locations and one or more threshold values, wherein $e_m$ represents an error value associated with an $m^{th}$ pixel; and
    diffusing a calculated overflow error value associated with each calculated error value, $e_m$, to at least one pixel neighbor of the $m^{th}$ pixel location.

2. The method of claim 1, wherein diffusing the calculated overflow error value includes pseudo-randomly diffusing the calculated overflow error value to the at least one pixel neighbor.

3. The method of claim 2, wherein pseudo-randomly diffusing the calculated overflow error value to the at least one pixel neighbor includes pseudo-randomly diffusing the overflow error value in a manner that takes into account one or more weighting factors selected for one or more neighboring pixel locations.

4. The method of claim 3, wherein the method further includes generating a pseudo random number and comparing the pseudo random number to the one or more weighting factors for the one or more neighboring pixel locations.

5. The method of claim 2, wherein pseudo-randomly diffusing the calculated overflow error value to the at least one pixel neighbor includes pseudo-randomly diffusing the overflow error value in a manner that accords an equal probability to a number of pixel neighbors of the $m^{th}$ pixel location.

6. The method of claim 5, wherein pseudo-randomly diffusing the overflow error value in a manner that accords an equal probability to a number of pixel neighbors of the $m^{th}$ pixel location includes assigning a bit value to each of the number of pixel neighbors and generating a pseudo random number having a bit length to all possible bit values assigned to each of the number of pixel neighbors.

7. A method for halftoning images, comprising:
encoding modified intensity values corresponding to pixel locations in reference to one or more threshold values;
performing an error diffusion process for calculated error values, $e_m$, corresponding to differences between the modified intensity value for each pixel location and the one or more threshold values, wherein $e_m$ represents an error value associated with an $m^{th}$ pixel;
calculating an overflow portion of the calculated error values, $e_m$; and
pseudo-randomly diffusing the overflow portion of the calculated error value back into the error diffusion process.

8. The method of claim 7, wherein the method includes scanning an image to detect the intensity values at the pixel locations.

9. The method of claim 7, wherein encoding the modified intensity values includes encoding using a multibit encoding scheme.

10. The method of claim 7, wherein the method includes printing images based upon the encoding of the modified intensity values that have been modified by pseudo-randomly diffusing the overflow portion of the calculated error value back into the error diffusion process.

11. The method of claim 7, wherein performing an error diffusion process includes performing a dynamic error diffusion process.

12. A method for halftoning images, comprising:
scanning an image to detect intensity values at pixel locations;
encoding modified intensity values associated with the pixel locations as binary values, in reference to one or more threshold values;
performing an error diffusion process for calculated error values, $e_m$, corresponding to differences between the modified intensity values for each pixel location and the one or more threshold values, wherein $e_m$ represents an error value associated with an $m^{th}$ pixel;
calculating an overflow portion of the calculated error values, $e_m$; and
pseudo-randomly diffusing the overflow portion of the calculated error value back into the error diffusion process.

13. The method of claim 12, wherein performing an error diffusion process for calculated error values, $e_m$, includes calculating a number of error diffuse terms, $E_n$, for diffusing the calculated error value, $e_m$, among one or more pixel neighbors of the $m^{th}$ pixel location as follows:

$$E_n = w_n \times e_n$$

wherein $E_n$ is an error diffuse term diffused to a $n^{th}$ pixel neighbor of the $m^{th}$ pixel location, and wherein $w_n$ is a weighting factor selected for the $n^{th}$ pixel location from a set of weighting factors.

14. The method of claim 13, wherein diffusing the calculated error value, $e_m$, among one or more pixel neighbors of the $m^{th}$ pixel as $E_n = w_n \times e_m$ includes randomly assigning the weighting factor $w_n$ to the $n^{th}$ pixel location.

15. The method of claim 14, wherein calculating an overflow portion of the calculated error values, $e_m$, includes calculating a residual overflow error term for each error diffuse term $E_n$ by performing a logical AND operation (&) with the calculated error value, $e_m$, and each weighting factor $w_n$ product, and by converting to hexadecimal (0x F).

16. The method of claim 15, wherein calculating an overflow portion of the calculated error values, $e_m$, includes calculating a total overflow error (TOF), and wherein calculating a TOF further includes:
summing the residual overflow error terms; and
performing an arithmetic shifting operation, wherein performing an arithmetic shifting operation includes shifting N places to the right depending on a power of 2, $(2^N)$ being used as a denominator of weighting factors $w_n$ in a given error diffusion scheme.

17. The method of claim 16, wherein the method includes rounding the summed residual overflow error terms.

18. The method of claim 17, wherein rounding the summed residual overflow error terms includes adding a numerator value and performing an arithmetic shifting operation equivalent to a value of 0.5.

19. A computer readable medium having a set of computer executable instructions to cause a device to perform an error diffusion method, comprising:
encoding an $m^{th}$ pixel location for a scanned image as a binary value associated with an intensity value for the $m^{th}$ pixel location;
assigning one or more error diffusion terms, $E_n$, to a number of pixel neighbors of the $m^{th}$ pixel location as follows:

$$E_n = w_n \times e_m$$

wherein $E_n$ is an error diffusion term diffused to a $n^{th}$ pixel neighbor from the $m^{th}$ pixel location, and wherein $w_n$ is a weighting factor selected for the $n^{th}$ pixel location from a set of weighting factors, and $e_m$ is a total error value associated with the $m^{th}$ pixel location corresponding to a difference between a modified intensity value for the $m^{th}$ pixel location and one or more threshold values;
stochastically assigning an overflow error value, representing a leftover portion of total error value $e_m$ not included in the one or more assigned error diffusion terms, $E_n$, to a pixel neighbor of the $m^{th}$ pixel location.

20. The computer readable medium of claim 19, wherein the method includes encoding an $(m+1)^{th}$ pixel location as a binary value associated with an intensity value for the $m^{th}$ pixel location, wherein encoding an $(m+1)^{th}$ pixel location as a binary value includes assigning a revised intensity value to the $(m+1)^{th}$ pixel location determined as the sum of;
a detected intensity value for the $(m+1)^{th}$ pixel location;
an error diffusion term assigned to the $(m+1)^{th}$ pixel location; and
any overflow error value stochastically assigned to the $(m+1)^{th}$ pixel location.

21. The computer readable medium of claim 19, wherein stochastically assigning an overflow error value to a pixel neighbor of the $m^{th}$ pixel location includes;
generating a pseudo random number;
performing an arithmetic shifting operation on the pseudo random number; and
comparing the arithmetic shifted pseudo random number to a weighting factor $w_n$ of each pixel location assigned an error diffusion term, $E_n$.

22. The computer readable medium of claim 21, wherein performing an arithmetic shifting operation includes shifting the pseudo random number N places to the right depending on a power of 2 $(2^N)$ associated with the weighting factors $w_n$ in a given error diffusion scheme.

23. The computer readable medium of claim 19, wherein stochastically assigning an overflow error value to a pixel neighbor of the $m^{th}$ pixel location includes diffusing the overflow error value in a manner that accords an equal probability to each of the number of pixel neighbors of the $m^{th}$ pixel location being assigned an error diffusion term, $E_n$.

24. The computer readable medium of claim 23, wherein diffusing the overflow error value in a manner that accords an equal probability to each of the number of pixel neighbors includes assigning a bit value to each of the number of pixel neighbors and generating a pseudo random number having a bit length to all possible bit values assigned to each of the number of pixel neighbors.

25. A digital halftoning processor, comprising:
an encoder configured to encode an intensity value associated with pixel locations as a binary value, in reference to one or more threshold values;
a diffuser, coupled to the encoder, wherein the diffuser is configured to;
    diffuse a calculated error value of an $m^{th}$ pixel location, $e_m$, corresponding to differences between modified intensity values for each pixel location and the one or more threshold values, to one or more pixel neighbors as one or more error diffusion terms, $$E_n = w_n \times e_m$$

wherein $E_n$ is an error value diffused to a $n^{th}$ pixel neighbor from the $m^{th}$ pixel location, and wherein $w_n$ is a weighting factor selected for the $n^{th}$ pixel neighbor from a set of weighting factors; and
    calculate an overflow portion of the calculated error value, $e_m$, which remains unassigned in the one or more error diffusion terms; and
a pseudo-random generator, coupled to the encoder and the diffuser, configured to randomly designate a pixel neighbor of the $m^{th}$ pixel location for receiving the unassigned overflow portion of the calculated error value, $e_m$.

26. The digital halftoning processor of claim 25, wherein the diffuser includes a dynamic error diffusion filter.

27. The digital halftoning processor of claim 25, wherein the pseudo-random generator includes a linear feedback shift register (LFSR).

28. The digital halftoning processor of claim 25, wherein the processor is operable to compare a random number, generated using the pseudo-random generator, with one or more weighting factors selected for the one or more pixel neighbors to randomly designate a pixel neighbor of the $m^{th}$ pixel location for receiving the unassigned overflow portion of the calculated error value, $e_m$.

29. The digital halftoning processor of claim 25, wherein the processor is operable to compare a random number, generated using the pseudo-random generator, with one or more bit values assigned to the one or more pixel neighbors to randomly designate a pixel neighbor of the $m^{th}$ pixel location for receiving the unassigned overflow portion of the calculated error value, $e_m$.

30. An image processing system, comprising:
a scanner configured to scan an image to detect intensity values at selected pixel locations;
a digital halftone processor to perform a digital halftone error diffusion process coupled to the scanner, wherein the digital halftone processor includes;
    an encoder configured to encode a number of pixel locations as a binary value representing an intensity value, in reference to one or more threshold values, and configured to calculate error values, $e_m$, corresponding to differences between modified intensity values for each pixel location and the one or more threshold values, wherein $e_m$ represents an error value associated with an $m_{th}$ pixel location;
    a diffuser, coupled to the encoder, configured to diffuse the calculated error value, $e_m$, to one or more pixel neighbors of the $m^{th}$ pixel location as follows:

$$E_n = w_n \times e_m$$

wherein $E_n$ is an error value term diffused to a $n^{th}$ pixel neighbor from the $m^{th}$ pixel location, and wherein $w_n$ is a weighting factor selected for the $n^{th}$ pixel neighbor from a set of weighting factors;
    software means operable on the system to calculate an overflow portion of the calculated error value, $e_m$, which remains unassigned to the one or more neighbor pixels of the $m^{th}$ pixel location; and
    software means operable on the system to diffuse the unassigned overflow portion to a pixel neighbor of the $m^{th}$ pixel location; and
a printer coupled to the digital halftone processor to print images by digital halftone printing based upon intensity values of pixel locations that have been modified by the digital halftone error diffusion process.

31. The system of claim 30, wherein the software means operable to calculate the overflow portion of the calculated error value, $e_m$, includes software operable to calculate the overflow portion as a sum of a four bit value shifted out of each error value term, $E_n$.

32. The system of claim 30, wherein the software means operable to diffuse the unassigned overflow portion includes software operable to pseudo-randomly assign the overflow portion to a pixel neighbor of the $m^{th}$ pixel location having an error value term, $E_n$, propagated thereto.

33. An image processing system, comprising:
a scanner configured to scan an image to detect intensity values at selected pixel locations;
a digital halftone processor to perform a digital halftone error diffusion process coupled to the scanner, wherein the digital halftone processor includes;
    an encoder configured to encode a number of pixel locations as a binary value representing an intensity value, in reference to one or more threshold values, and configured to calculate error values, $e_m$, corresponding to differences between modified intensity values for each pixel location and the one or more threshold values, wherein $e_m$ represents an error value associated with an $m^{th}$ pixel location;
    a diffuser, coupled to the encoder, configured to diffuse the calculated error value, $e_m$, to one or more pixel neighbors of the $m^{th}$ pixel location as follows:

$$E_n = w_n \times e_m$$

wherein $E_n$ is an error value term diffused to a $n^{th}$ pixel neighbor from the $m^{th}$ pixel location, and wherein $w_n$ is a weighting factor selected for the $n^{th}$ pixel neighbor from a set of weighting factors;
    an overflow filter coupled to the diffuser to calculate an overflow portion of the calculated error values, $e_m$, which remains unassigned to the one or more pixel neighbors of the $m^{th}$ pixel location; and
    a pseudo-random generator, coupled to the overflow filter and the diffuser, wherein the pseudo-random generator is configured to randomly designate a pixel neighbor of the $m^{th}$ pixel location for receiving the unassigned overflow portion of the calculated error value, $e_m$; and
a printer coupled to the digital halftone processor to print images by digital halftone printing based upon intensity values of pixel locations that have been modified by the digital halftone error diffusion process.

34. The image processing system of claim 33, wherein the pseudo-random generator is configured to randomly designate a pixel neighbor of the $m^{th}$ pixel location for receiving the unassigned overflow portion in a manner that accounts for weighting factors selected for one or more pixel neighbors of the $m^{th}$ pixel location.

35. The image processing system of claim 33, wherein the scanner and the printer are included in a single All-in-One (AiO) device.

* * * * *